US009787977B2

(12) United States Patent
Bernard et al.

(10) Patent No.: US 9,787,977 B2
(45) Date of Patent: *Oct. 10, 2017

(54) 3D GLASSES, DISPLAY APPARATUS AND CONTROL METHOD THEREOF

(71) Applicant: SAMSUNG ELECTRONICS CO., LTD., Suwon-si (KR)

(72) Inventors: Thomas Bernard, Middlesex (GB); Graham John Mudd, Middlesex (GB)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/816,471

(22) Filed: Aug. 3, 2015

(65) Prior Publication Data
US 2015/0341625 A1 Nov. 26, 2015

Related U.S. Application Data

(63) Continuation of application No. 13/755,407, filed on Jan. 31, 2013, now Pat. No. 9,124,882.

(30) Foreign Application Priority Data

Jan. 31, 2012 (GB) .................... 1201633.3

(51) Int. Cl.
H04N 13/04 (2006.01)
H04N 9/47 (2006.01)
(Continued)

(52) U.S. Cl.
CPC ..... H04N 13/0454 (2013.01); G02B 27/2228 (2013.01); G02F 1/1313 (2013.01);
(Continued)

(58) Field of Classification Search
USPC ... 348/58, 51, 53, 54, 55, 56, 68, 77, 14.07, 348/14.11, 42, 43, 44, 49, 128, 396.1,
(Continued)

(56) References Cited

U.S. PATENT DOCUMENTS 5,293,227 A 3/1994 Prince
8,294,752 B2 10/2012 Mihara et al.
(Continued)

FOREIGN PATENT DOCUMENTS

CN 101762880 A 6/2010
EP 2202991 A2 6/2010
(Continued)

OTHER PUBLICATIONS

Communication dated May 29, 2012 from the Intellectual Property Office of the United Kingdom in counterpart application No. GB 1201633.3.
(Continued)

Primary Examiner — Jefferey F Harold
Assistant Examiner — Mustafizur Rahman
(74) Attorney, Agent, or Firm — Sughrue Mion, PLLC

(57) ABSTRACT

A display apparatus switching between a two-dimensional (2D) display mode and a three-dimensional (3D) display mode is provided. The display apparatus includes: an imaging device configured to capture an image a pair of 3D glasses worn by a user to view an image displayed in the 3D display mode, wherein the 3D glasses are switchable between a plurality of different states; a transmitter/emitter module configured to remotely control the 3D glasses so as to switch the states of the 3D glasses; and a controller configured to determine whether the user is wearing the 3D glasses based on a state of the 3D glasses in the image captured by the imaging device, and to control the display
(Continued)

apparatus to operate in the 3D display mode when it is determined that the user is wearing the 3D glasses.

14 Claims, 12 Drawing Sheets

(51) Int. Cl.
  *G02B 27/22* (2006.01)
  *G02F 1/13* (2006.01)
(52) U.S. Cl.
  CPC ..... *H04N 13/0434* (2013.01); *H04N 13/0438* (2013.01); *H04N 13/0452* (2013.01); *H04N 13/0497* (2013.01)
(58) Field of Classification Search
  USPC .... 348/437.1, 636, 680, 693, 705, 706, 723, 348/725, 730; 345/6, 7, 419, 426, 156; 349/13, 61; 398/23, 24, 65, 106, 111, 398/152, 207; 359/462, 464, 466
  See application file for complete search history.

(56) References Cited

U.S. PATENT DOCUMENTS

| | | | |
|---|---|---|---|
| 8,363,095 B2 | 1/2013 | Mitani et al. | |
| 8,675,044 B2* | 3/2014 | Yu | H04N 13/0429 348/42 |
| 8,791,991 B2 | 7/2014 | Lee et al. | |
| 2002/0008783 A1* | 1/2002 | Kurashige | H04N 9/74 348/590 |
| 2004/0165119 A1 | 8/2004 | Choi et al. | |
| 2005/0041162 A1 | 2/2005 | Lee et al. | |
| 2006/0061652 A1 | 3/2006 | Sato et al. | |
| 2007/0086649 A1 | 4/2007 | Yang et al. | |
| 2009/0109282 A1* | 4/2009 | Schnebly | G02B 27/2242 348/55 |
| 2010/0021141 A1 | 1/2010 | Yamashita et al. | |
| 2010/0066819 A1* | 3/2010 | Yu | H04N 13/0429 348/53 |
| 2010/0124402 A1 | 5/2010 | Minobe | |
| 2010/0157425 A1 | 6/2010 | Oh | |
| 2010/0171697 A1 | 7/2010 | Son et al. | |
| 2010/0182404 A1* | 7/2010 | Kuno | G02B 27/2264 348/43 |
| 2010/0260483 A1 | 10/2010 | Strub | |
| 2010/0295929 A1 | 11/2010 | Yoshifuji et al. | |
| 2010/0328439 A1* | 12/2010 | Mihara | G09G 3/003 348/53 |
| 2010/0328533 A1* | 12/2010 | Mitani | H04N 13/0438 348/521 |
| 2011/0012896 A1 | 1/2011 | Ji | |
| 2011/0012993 A1 | 1/2011 | Kuno | |
| 2011/0102555 A1* | 5/2011 | Yasui | H04N 13/0429 348/51 |
| 2011/0115888 A1* | 5/2011 | Matsumoto | H04N 13/0066 348/51 |
| 2011/0156998 A1* | 6/2011 | Huang | H04N 13/0438 345/156 |
| 2011/0157329 A1* | 6/2011 | Huang | H04N 13/0454 348/54 |
| 2011/0157334 A1* | 6/2011 | Kim | G02B 27/2264 348/56 |
| 2011/0157335 A1* | 6/2011 | Yoo | G02B 27/2264 348/56 |
| 2011/0187835 A1* | 8/2011 | Park | H04N 13/04 348/51 |
| 2011/0199469 A1* | 8/2011 | Gallagher | H04N 13/0285 348/60 |
| 2011/0221871 A1 | 9/2011 | Sakaniwa et al. | |
| 2011/0228056 A1* | 9/2011 | Okumoto | H04N 13/0438 348/51 |
| 2011/0273463 A1* | 11/2011 | Lee | G02B 27/2264 345/545 |
| 2011/0285827 A1 | 11/2011 | Takigawa et al. | |
| 2011/0299764 A1 | 12/2011 | Snoek | |
| 2011/0310097 A1* | 12/2011 | Ushio | H04N 13/026 345/419 |
| 2012/0019616 A1* | 1/2012 | Chen | H04N 13/0296 348/43 |
| 2012/0026396 A1* | 2/2012 | Banavara | H04N 13/045 348/500 |
| 2012/0127282 A1* | 5/2012 | Hwangbo | H04N 13/0454 348/51 |
| 2012/0133645 A1* | 5/2012 | Jung | H04N 13/0011 345/419 |
| 2012/0147136 A1* | 6/2012 | Ji | H04N 13/0029 348/43 |
| 2013/0002650 A1* | 1/2013 | Ko | G02B 27/2264 345/419 |
| 2013/0002839 A1* | 1/2013 | Pennisi | G06K 9/00281 348/58 |

FOREIGN PATENT DOCUMENTS

| | | |
|---|---|---|
| EP | 2315451 A2 | 4/2011 |
| EP | 2369402 A1 | 9/2011 |
| GB | 2481094 A | 12/2011 |
| JP | 8111876 A | 4/1996 |
| JP | 1175223 A | 3/1999 |
| JP | 2008129901 A | 6/2008 |
| JP | 201033141 A | 2/2010 |
| JP | 2012-10136 A | 1/2012 |
| WO | 2011083433 A1 | 7/2011 |
| WO | 2011115047 A1 | 9/2011 |

OTHER PUBLICATIONS

Notice of Allowance issued in parent U.S. Appl. No. 13/755,407 mailed Apr. 22, 2015.
Communication dated Sep. 14, 2015 issued by the European Patent Office in counterpart European Patent Application No. 13153468.7.
Communication dated Dec. 4, 2015 issued by the State Intellectual Property Office of P.R. China in counterpart Chinese Patent Application No. 201310039240.8.
Communication dated Jan. 20, 2016 issued by the European Patent Office in counterpart European Patent Application No. 13153468.7.

* cited by examiner

3D GLASSES, DISPLAY APPARATUS AND CONTROL METHOD THEREOF

CROSS-REFERENCE TO RELATED APPLICATION

This is a continuation application of U.S. application Ser. No. 13/755,407 filed Jan. 31, 2013, which claims priority from British Patent Application No. 1201633.3 filed on Jan. 31, 2012, the disclosures of which are incorporated herein by reference in their entirety.

BACKGROUND

1. Field

Methods and apparatuses consistent with exemplary embodiments relate to detecting an object, and more particularly, to remotely altering the appearance of an object, capturing an image, and comparing a variation in pixel values within a region of the image to an expected variation to determine whether the object is located in the region.

2. Related Art

Recently, display devices such as televisions and computer monitors have been developed that are capable of reproducing moving images in a three-dimensional (3D) display mode. In order for a 3D effect to be perceived, it is necessary for different images to be presented to the left and right eyes of the viewer. To achieve this, a 3D display device displays separate left-eye and right-eye images, and a user wears specially-designed 3D glasses that ensure that each eye only sees the image intended for that eye. Such glasses can be categorized as 'active' or 'passive', depending on how the images are filtered. Active glasses include a liquid crystal (LC) shutter for each eye, which can be turned opaque when the image intended for the opposite eye is being displayed. Passive glasses include a polarizing filter for each eye, the left-eye and right-eye filters having different polarization directions.

In both the active and passive systems, the 3D display device displays both left-eye and right-eye images in the 3D mode, and displays only images for a single viewpoint in the 2D mode. Display devices have been developed that can convert video content from a 2D format into a 3D format and vice versa, enabling a user to choose whether to watch particular content in 2D or in 3D. For example, a user may choose to view a conventional 2D program in the 3D format to enjoy the 3D effect, or may choose to view a 3D program in 2D when a number of people want to watch the program and there are not enough glasses available. However, to change between the modes, the user has to manually switch the display mode of the 3D display device. For any given content, the user may not know whether they prefer the 2D or 3D format, and the inconvenience of having to switch between modes may discourage them from using the 3D format at all.

SUMMARY

According to an aspect of an exemplary embodiment, there is provided a system including a transmitter for sending a signal to a device including a liquid-crystal LC panel, to switch the LC panel between a plurality of states having different optical properties, an imaging device arranged to capture image data while the LC panel is switched, and a controller arranged to select a region within the captured image data and compare a variation in pixel values in the region to an expected variation based on information about an appearance of the device while the LC panel is switched, to determine whether the device is located in the region.

The device may be a pair of glasses wearable by a user to view visual data reproduced in a first display mode on a display device, the glasses including first and second LC panels switchable between a transparent state and an opaque state, wherein the controller is arranged to select the region within the captured image data by executing a facial recognition algorithm on the captured image data, to determine whether the user is wearing the glasses, and wherein if it is determined that the user is wearing the glasses, the system is arranged to control the display device to switch into the first display mode from a second display mode, the second display mode being a mode in which the glasses are not required.

The transmitter may be arranged to send the signal to the 3D glasses to switch the first and second LC panels into different ones of the transparent and opaque states.

When a face is detected by the facial-recognition algorithm, the controller may be arranged to select the region to include left-eye and right-eye areas within the face.

The controller may be arranged to identify the left-eye and right-eye areas within the face by estimating which pixels should be obscured by the glasses if the user is wearing the glasses.

The facial-recognition algorithm may be arranged to directly detect the left-eye and right-eye areas within the face.

The variation in pixel values in the region may be a variation between a representative luminance value of the left-eye area and a representative luminance value of the right-eye area, and the expected variation is a luminance contrast between the left-eye and right-eye regions.

The representative luminance values of the right-eye and left-eye areas may be mean luminance values of pixels within the respective right-eye or left-eye area.

The controller may be arranged to obtain information about a switching time for which the first or second LC panel will remain switched after sending the signal, and wherein if a time taken to capture the image data by the imaging device is longer than the switching time of the glasses, the transmitter is arranged to repeatedly send the signal to the glasses while the image data is being captured.

If a number of faces are identified by the facial-recognition algorithm, the controller may be arranged to determine for each face whether that user is wearing a pair of the glasses, and wherein if it is determined that at least a predetermined number of the total number of faces are wearing a pair of the glasses, the system is arranged to switch the display device into the first display mode.

The transmitter may be arranged to sequentially switch the LC panel according to a predetermined sequence over a time period, the imaging device being arranged to capture the image data at intervals during the time period, and the controller may be arranged to compare the variation in pixel values during the time period with the expected variation based on the predetermined sequence.

The device may be arranged to store information about the predetermined sequence, and respond to the signal from the transmitter by switching the LC panel according to the known sequence.

The transmitter may be arranged to send signals to a plurality of devices each including a switchable LC panel, a different predetermined sequence being assigned to each one of the plurality of devices, and the controller may be arranged to identify one of the devices in the selected region if the variation in pixel values during the time period matches the expected variation based on the predetermined sequence assigned to said one of the devices.

The controller may be arranged to obtain an alias frequency based on a frequency with which the image data is captured during the time period and a frequency with which the LC panel is switched during the time period, and apply a sub-sampling algorithm based on the alias frequency to the predetermined sequence to identify the expected variation.

A device for use in the system may include an LC panel switchable between a plurality of states having different optical properties, and a reflective layer having a higher reflectivity than the LC panel at a wavelength of electromagnetic radiation detectable by the imaging device, the reflective layer being arranged such that in use, the LC layer is disposed between the reflective layer and the imaging device of the system.

A device suitable for use in the system may include an LC panel switchable between a plurality of states having different optical properties, a memory for storing the predetermined sequence assigned to the object, a receiving module for receiving the signal from the transmitter, and a switching controller responsive to the signal to switch the LC panel between the plurality of display states according to the predetermined sequence.

According to an aspect of another exemplary embodiment, there is provided a system including an illuminating module for illuminating an object with polarized electromagnetic radiation having a predetermined polarization direction, the object including a polarizing filter, an imaging device arranged to capture image data while the object is illuminated, and a controller arranged to select a region within the captured image data and compare a variation in pixel values in the region to an expected variation based on information about an appearance of the object while the object is illuminated, to determine whether the object is located in the region.

The object may be a pair of glasses wearable by a user to view visual data reproduced in a first display mode on a display device, the glasses including first and second polarizing filters having different polarization directions from each other, wherein the controller may be arranged to select the region within the captured image data by executing a facial recognition algorithm on the captured image data, to determine whether the user is wearing the glasses, and wherein if it is determined that the user is wearing the glasses, the system is arranged to control the display device to switch into the first display mode from a second display mode, the second display mode being a mode in which the glasses are not required.

When a face is detected by the facial-recognition algorithm, the controller may be arranged to select the region to include left-eye and right-eye areas within the face.

The controller may be arranged to identify the left-eye and right-eye areas within the face by estimating which pixels should be obscured by the glasses if the user is wearing the glasses.

The facial-recognition algorithm may be arranged to directly detect the left-eye and right-eye areas within the face.

The variation in pixel values in the region may be a variation between a representative luminance value of the left-eye area and a representative luminance value of the right-eye area, and the expected variation may be a luminance contrast between the left-eye and right-eye regions.

The representative luminance values of the right-eye and left-eye areas may be mean luminance values of pixels within the respective right-eye or left-eye area.

If a number of faces are identified by the facial-recognition algorithm, the controller may be arranged to determine for each face whether that user is wearing a pair of the glasses, and wherein if it is determined that at least a predetermined number of the total number of faces are wearing a pair of the glasses, the system is arranged to switch the display device into the first display mode.

An object for use in the system may include a polarizing filter, and a reflective layer having a higher reflectivity than the polarizing filter at a wavelength of electromagnetic radiation detectable by the imaging device, and arranged such that in use, the polarizing filter is disposed between the reflective layer and the imaging device of the system.

According to an aspect of another exemplary embodiment, there is provided a method including sending a signal to a device including a liquid-crystal LC panel, to switch the LC panel between a plurality of states having different optical properties, capturing image data while the LC panel is switched, selecting a region within the captured image data, and comparing a variation in pixel values in the region to an expected variation based on information about an appearance of the device while the LC panel is switched, to determine whether the device is located in the region.

According to an aspect of another exemplary embodiment, there is provided a method including illuminating an object with polarized electromagnetic radiation having a predetermined polarization direction, the object including a polarizing filter, capturing image data while the object is illuminated, selecting a region within the captured image data, and comparing a variation in pixel values in the region to an expected variation based on information about an appearance of the object while the object is illuminated, to determine whether the object is located in the region.

According to the present invention there is also provided a computer-readable storage medium storing a computer program which, when executed on a processor, causes the processor to perform the method.

According to the present invention there is also provided a display apparatus switching between a two-dimensional (2D) display mode and a three-dimensional (3D) display mode, the display apparatus including: an imaging device to capture an image including a plurality of different states of a pair of 3D glasses worn by a user, to view an image displayed in the 3D display mode; a transmitter/emitter module to remotely control the 3D glasses so as to switch the states of the 3D glasses; and a controller to determine whether the user is wearing the 3D glasses based on the states, and to control the display apparatus to operate in the 3D display mode when the user is wearing the 3D glasses.

The 3D glasses may include active glasses or passive glasses.

The 3D glasses may include a liquid crystal shutter when the 3D glasses are the active glasses, and the liquid crystal shutter of the 3D glasses switches between a transparent state and an opaque state based on a signal transmitted from the transmitter/emitter module.

The 3D glasses may include a polarizing filter when the 3D glasses are the passive glasses, and the polarizing filter of the 3D glasses switches between a vertical state and a horizontal state based on polarized light emitted from the transmitter/emitter module.

The controller may selects a region within the image captured by the imaging device while a state of the 3D glasses is switching.

The controller may use a face recognition algorithm or a pattern recognition algorithm to select the region.

The controller may compare a variation in pixel values in the selected region with an expected variation, and determine that the user is wearing the 3D glasses when a difference between the variation in the pixel values and the expected variation is above a predetermined threshold value.

The selected region may include a left-eye area and a right-eye area which are symmetrical, the variation in the pixel values in the region may be a variation between a representative luminance value of the left-eye area and a representative luminance value of the right-eye area, and the expected variation may be a luminance contrast between the left-eye and right-eye areas.

The display apparatus may further include a storage unit to store information about a switching time for which the 3D glasses will remain switched and about a capture time taken for the imaging device to capture the image, wherein the controller compares the capture time with the switching time, and controls the transmitter/emitter module to switch the states of the 3D glasses within the capture time when the capture time is longer than the switching time.

When a plurality of faces are detected by the face recognition algorithm, the controller may determine whether a plurality of users are wearing the 3D glasses on the faces, and when it is determined that at least a predetermined number of the users are wearing the 3D glasses, the controller may switch the display apparatus into the 3D display mode.

The transmitter/emitter module may switch the states of the 3D glasses corresponding to the left-eye area and the right-eye area in a predetermined sequence for a predetermined time period, and the controller may determine whether the variation in the pixel values for the predetermined time period matches the expected variation based on the predetermined sequence.

The controller may obtain an alias frequency based on a frequency with which the image is captured for the time period and a frequency with which the 3D glasses are switched for the time period, and apply a sub-sampling algorithm based on the alias frequency to the predetermined sequence to identify the expected variation.

According to an aspect of an exemplary embodiment, there is provided three-dimensional (3D) glasses including: left-eye and right-eye apertures; a reflective layer disposed at a rear of the left-eye and right-eye apertures and having a higher reflectivity than the left-eye and right-eye apertures; an receiver to receive control of a display apparatus; and a switching controller to switch the left-eye and right-eye apertures between a plurality of different states according to the received control of the display apparatus, wherein the reflective layer increases a difference in pixel values between the left-eye aperture and the right-eye aperture in an image captured by the display apparatus.

The 3D glasses may include active glasses or passive glasses.

The left-eye and right-eye apertures may include a liquid crystal shutter when the 3D glasses are the active glasses, and the switching controller may switch the left-eye and right-eye apertures between a transparent state and an opaque state based on a signal of the display apparatus received by the receiver.

The left-eye and right-eye apertures may include a polarizing filter when the 3D glasses are the passive glasses, and the switching controller switches the left-eye and right-eye apertures between a vertical state and a horizontal state based on polarized light emitted from the display apparatus received by the receiver.

The 3D glasses may further include a memory to store a predetermined sequence for switching the left-eye and right-eye apertures corresponding to the control of the display apparatus.

According to an aspect of an exemplary embodiment, there is provided a control method of a display apparatus switching between a two-dimensional (2D) display mode and a three-dimensional (3D) display mode, the control method including: remotely controlling 3D glasses so that the 3D glasses worn by a user to view an image displayed in the 3D display mode switch between a plurality of different states; capturing an image of the 3D glasses while the 3D glasses are switching between the different states; determining whether the user is wearing the 3D glasses based on a state of the 3D glasses included in the captured image; and controlling the display apparatus to operate in the 3D display mode when the user is wearing the 3D glasses.

The 3D glasses may include active glasses or passive glasses.

The 3D glasses include a liquid crystal shutter when the 3D glasses are the active glasses, and the remotely controlling may further include transmitting a signal to the 3D glasses so that the liquid crystal shutter of the 3D glasses switches between a transparent state and an opaque state.

The 3D glasses may include a polarizing filter when the glasses are the passive glasses, and the remotely controlling may further include emitting polarized light to the 3D glasses so that the polarizing filter of the 3D glasses switches between a vertical state and a horizontal state.

The controlling may further include selecting a region within the image captured by the display apparatus while the state of the 3D glasses is switching.

The selecting the region may further include using a face recognition algorithm or a pattern recognition algorithm.

The control method may further include comparing a variation in pixel values in the selected region with an expected variation, and determining that the user is wearing the 3D glasses when a difference between the variation in the pixel values and the expected variation is above a predetermined threshold value.

The selected region may include a left-eye area and a right-eye area which are symmetrical, the variation in the pixel values in the region may be a variation between a representative luminance value of the left-eye area and a representative luminance value of the right-eye area, and the expected variation may be a luminance contrast between the left-eye and right-eye areas.

The control method may further include: storing information about a switching time for which the 3D glasses will remain switched and about a capture time taken for the display apparatus to capture the image; comparing the capture time with the switching time; controlling to switch the state of the 3D glasses within the capture time when the capture time is longer than the switching time.

When a plurality of faces are detected by the face recognition algorithm, the controlling may further includes determining whether a plurality of users are wearing the 3D glasses on the faces, and when it is determined that at least a predetermined number of the users are wearing the 3D glasses, the controlling may further include switching the display apparatus into the 3D display mode.

The control method may further include switching the state of the 3D glasses corresponding to the left-eye area and the right-eye area in a predetermined sequence for a predetermined time period; and determining whether the variation in the pixel values for the predetermined time period matches the expected variation based on the predetermined sequence.

The control method may further include obtaining an alias frequency based on a frequency with which the image is captured for the time period and a frequency with which the 3D glasses are switched for the time period, and applying a sub-sampling algorithm based on the alias frequency to the predetermined sequence to identify the expected variation.

BRIEF DESCRIPTION OF THE DRAWINGS

The above and/or other aspects will be more apparent by describing in detail exemplary embodiments, with reference to the accompanying drawings, in which.

DETAILED DESCRIPTION

Exemplary embodiments will now be described that can detect whether an object is located in a particular region within captured image data. For example, such embodiments can find use in 3D display systems, by detecting whether a user is wearing glasses for viewing 3D content.

Figure 1:
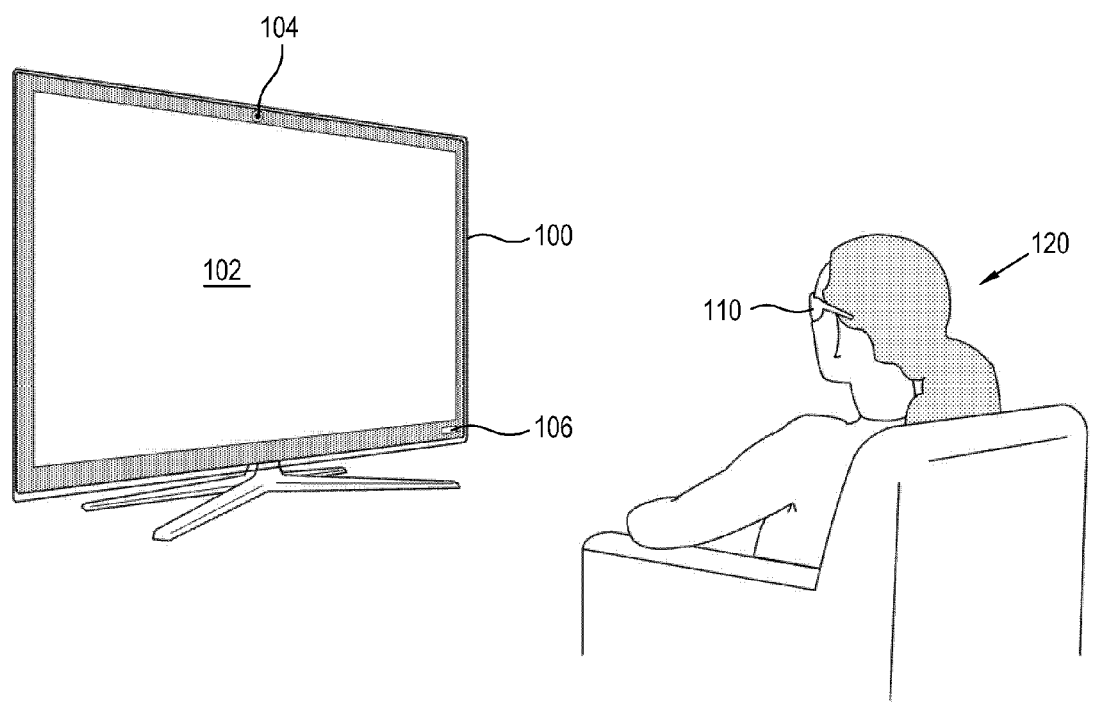
FIG. 1 illustrates a system for detecting whether a user is wearing 3D glasses, according to an exemplary embodiment.
Figure 2:
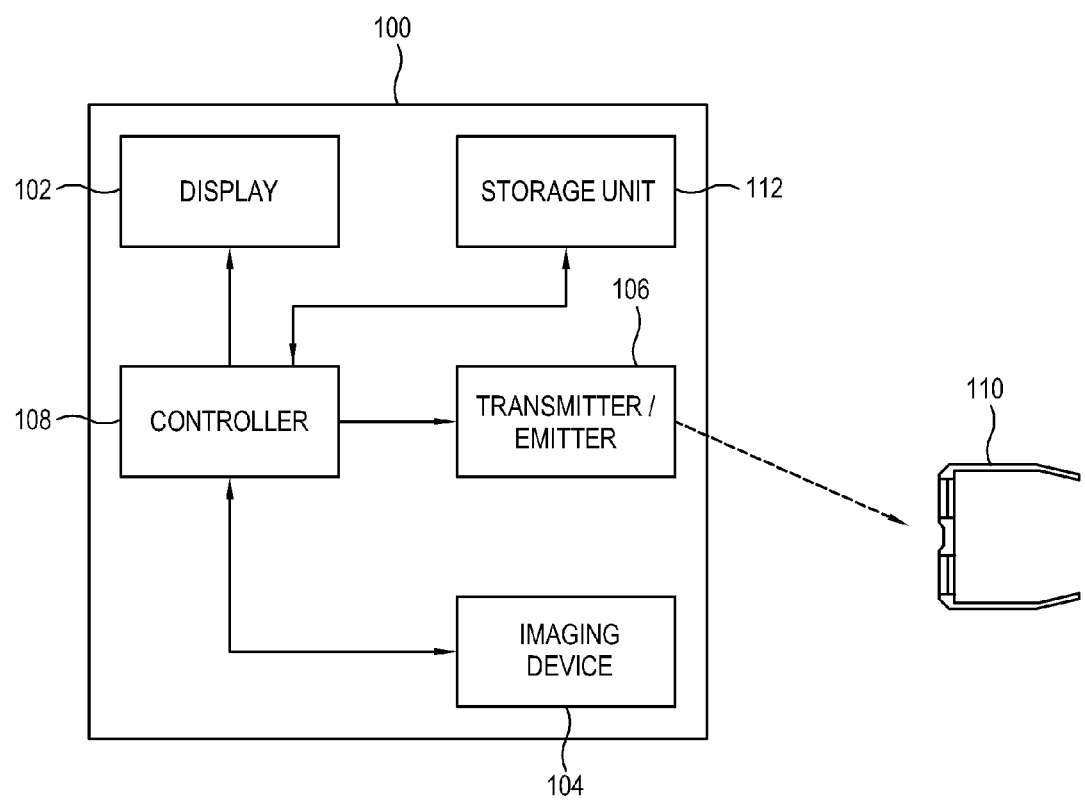
FIG. 2 schematically illustrates the system of FIG. 1.

Referring now to FIGS. 1 and 2, a system for detecting whether a user is wearing 3D glasses is illustrated, according to an exemplary embodiment. The system includes a television 100 capable of reproducing video data in 2D and 3D reproduction modes, and a pair of 3D glasses 110 wearable by a user 120 to view video data being reproduced in the 3D mode. The television 100 includes a display 102, an imaging device 104, for example a video camera for capturing video image data or a digital camera for capturing still image data, a transmitter or emitter module 106, a controller 108, and a storage unit 112. The imaging device may capture images at visible wavelengths of light, or at other wavelengths, for example at infra-red (IR) wavelengths. The display 102 can be any display capable of reproducing video in 2D and 3D modes, for example an organic light-emitting diode (OLED) panel, a liquid crystal display (LCD) panel, or a plasma display panel (PDP). In the present embodiment the system is included in the same body as the display device, i.e., is integrated into the TV. However, in other embodiments the system may be separate from the display device, for example could be implemented in a device such as a set-top box or Blu-ray player connected to the TV. In such embodiments, the system may include its own transmitter/emitter module and imaging device, or could make use of a transmitter/emitter and imaging device already included in the TV.

The type of transmitter/emitter module 106 used in any particular embodiment will depend on the type of object that is being detected. The object to be detected can include an optical member that can be made to appear more transparent or more opaque in a captured image, by activating the transmitter/emitter module 106. That is, the apparent opacity of the optical member in the image can be altered by the transmitter/emitter module 106. The transmitter/emitter module can be adapted to render the optical member completely opaque or completely transparent, or partially opaque, i.e., any intermediate state.

For example, the object may be a switchable device such as a pair of active 3D glasses including switchable liquid-crystal (LC) shutters. In 3D display devices for use with active glasses, left-eye and right eye images are displayed as alternate frames. The left eye and right eye of the glasses each includes an LC shutter switchable between transparent and opaque states. Other types of shutter could be substituted for LC shutters. For example electrochromic glass could be used. While a left-eye image is displayed, the right eye of the glasses is turned opaque and the left eye of the glasses remains transparent, and vice versa. When the object to be detected is a pair of active glasses, the transmitter/emitter module 106 may be a transmitter for sending signals to the glasses. The signals cause the glasses to switch between a plurality of states having different optical properties, for example by switching one or both of the LC shutters between opaque and transparent states. Because the states have different optical properties, they can be distinguished in images captured by the imaging device. Therefore the system can differentiate the object from other similarly-shaped objects, for example, can differentiate active 3D glasses from standard reading glasses, by switching the object into a known state and analyzing a captured image to find a pixel pattern indicative of the object's appearance in the switched state.

Exemplary embodiments can also detect objects that are not switchable, for example passive 3D glasses. The passive glasses include two polarizing filters having different polarizing directions. In such embodiments, the transmitter/emitter module 106 can include an emitter adapted to alter the appearance of the object by illuminating the object with polarized light. Specifically, when the polarized light has a similar polarization direction to a polarizing filter, the light can pass through the filter and so the filter has a relatively high brightness in an image captured by the imaging device. Alternatively, if the polarizing light has a polarization direction substantially perpendicular to the polarization direction of the filter, the filter will absorb the light and appear dark, i.e. have a low brightness, in the captured image. Accordingly, when the glasses are illuminated with polarized light having the same polarization direction as the left-eye filter, the left eye of the glasses will appear light in the image data recorded by the imaging device, and the right eye of the glasses will appear dark. Similarly, if the glasses are illuminated with polarized light having the same polarization direction as the right-eye filter, the right eye of the glasses will appear light in the image data recorded by the imaging device, and the left eye of the glasses will appear dark.

In both scenarios described above, i.e., when the object includes a switchable LC part or includes a passive polarizing filter, the transmitter/emitter module can remotely alter the appearance of the object to the imaging device in a known manner. The image date captured while the appearance is altered can be analyzed to identify a pixel pattern indicative of the altered appearance, and this can be used to locate the object in the image. Furthermore, even when an object is superficially similar to another object, for example as a pair of active or passive 3D glasses are superficially similar to conventional reading glasses, the system can alter the appearance of the 3D glasses to reliably distinguish the 3D glasses in the captured image. Specifically, in the case of either active or passive 3D glasses, a transmitter/emitter module can cause one eye of the glasses to appear opaque in the captured image, and the other eye of the glasses to appear transparent.

Figure 3:
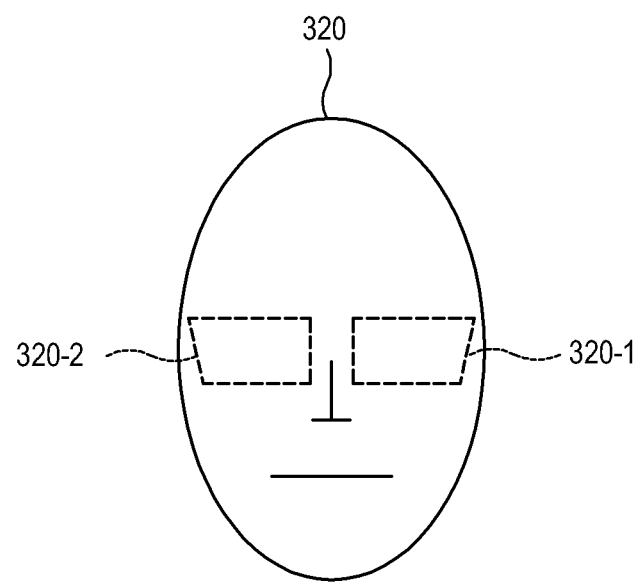
FIG. 3 illustrates a method for using a facial recognition algorithm to determine whether a user is wearing 3D glasses, according to an exemplary embodiment.
Figure 4A:
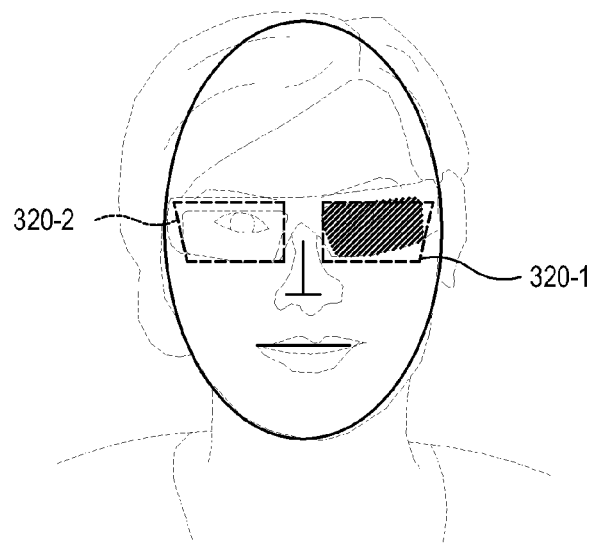
FIGS. 4A and 4B illustrate, respectively, the method of FIG. 3 applied when a user is and is not wearing glasses.
Figure 4B:
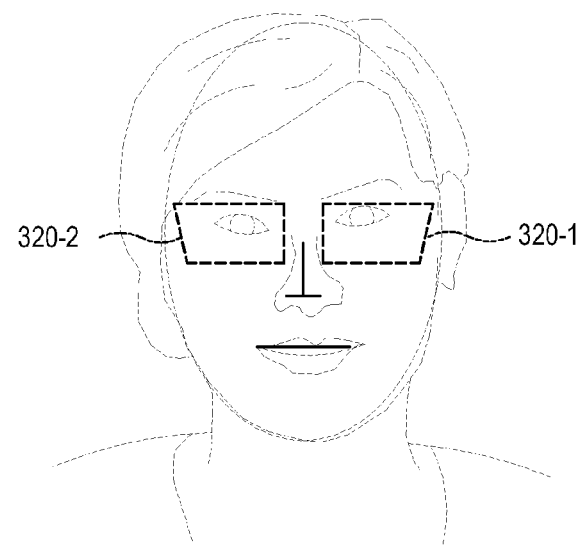

Referring now to FIGS. 3, 4A and 4B, a method for determining whether a user is wearing 3D glasses is illustrated, according to an exemplary embodiment. Here, the controller 108 is arranged to execute a facial-recognition algorithm to locate a face within an image captured by the imaging device. Since active glasses can be used in any orientation, it is preferable for the algorithm to be able to detect faces in different orientations, for example when a user is lying down. When the face 320 is located, the controller 108 identifies a left-eye area 320-1 and a right-eye area 320-2 within the face 320. Specifically, the left-eye and right-eye areas 320-1, 320-2 are those areas within the face that include pixels that should be obscured by the 3D glasses if the user is wearing the glasses. The controller 108 can locate the left-eye and right-eye areas 320-1, 320-2 by using the facial recognition algorithm to directly detect the relevant areas of the face 320 by analyzing pixel patterns within the detected face 320, or can locate the left-eye and right-eye areas 320-1, 320-2 by estimating those pixels which would be obscured.

As shown in FIG. 4A, if an image is captured while one eye of the glasses appears darker than the other, there will be a luminance contrast between pixels in the left-eye 320-1 and right-eye 320-2 areas. As described above with reference to FIGS. 1 and 2, this feature can be used to distinguish the 3D glasses over similarly-shaped objects, e.g., reading glasses. Also, the luminance contrast can be used to distinguish a face that is wearing 3D glasses from a face that is not wearing 3D glasses. As shown in FIG. 4B, when the user is not wearing 3D glasses, the luminance levels of pixels in the left-eye 320-1 and right-eye 320-2 areas will be similar.

The luminance contrast shown in FIG. 4A can be achieved by activating the transmitter/emitter module while capturing image data, to alter the appearance of the 3D glasses. For example, one shutter of a pair of active glasses can be switched, or a pair of passive glasses can be illuminated with polarized light at a wavelength detectable by the imaging device. Exemplary embodiments can therefore determine whether a user is wearing 3D glasses by activating a transmitter/emitter module that causes one eye of the glasses to appear brighter than the other eye of the glasses, capturing an image while the appearance of the glasses is altered, executing a facial-recognition algorithm to detect the user's face in the captured image, and comparing luminance levels of the left-eye and right-eye areas to determine whether there is a contrast. If the luminance contrast between the left-eye and right-eye areas is above a predetermined threshold contrast, it is determined that the user is wearing 3D glasses.

To determine whether there is a luminance contrast between the left-eye and right-eye areas 320-1, 320-2, the controller can obtain a representative luminance value for each area 320-1, 320-2. The representative luminance value can be the sum of all luminance values of pixels within the relevant left-eye or right-eye area 320-1, 320-2, or can be an average luminance value of pixels within the relevant area. For example, the mean pixel value or the mode pixel value within the relevant area could be used. If the mode value is to be used, then depending on the particular imaging device and lighting conditions it may be preferable to first reduce the color depth of the image so that similar pixel values within an area are converted to the same value. As a further alternative, in other embodiments a color variance within the relevant area may be analyzed instead of a luminance contrast. If the user is wearing 3D glasses and one eye of the glasses appears opaque, for example because it is switched to an opaque state or because the glasses are illuminated with polarized light, the opaque eye will be more uniform in color than the transparent eye of the glasses.

In some embodiments, the left-eye and right-eye areas may be compared based on facial symmetry. For example, the value of a left-eye pixel can be compared against the value of a right-eye pixel in the symmetrical position, i.e. the pixel position is reflected in the center line of the face to identify the pixel to be used for the comparison. This can be repeated for each symmetrically-related pair of left-eye and right-eye pixels, and the proportion of pixels showing a luminance contrast above a threshold value can be counted. If enough of the pixel pairs show a high luminance contrast, it can be determined that the user is wearing the 3D glasses. In this example, it is not necessary to explicitly define both left-eye and right-eye areas. That is, only the left-eye pixels or the right-eye pixels need to be identified, and the pixels to be used for comparison are selected based on symmetry.

In the embodiment of FIG. 3, the left-eye and right-eye areas 320-1, 320-2 have the same area, i.e. include the same number of pixels. In some embodiments, the facial-recognition algorithm can determine whether the user's face is inclined with respect to the imaging device, i.e. if the user is not looking directly at the imaging device, and can adjust the relative areas of the left-eye and right areas accordingly. If the adjusted left-eye and right-eye areas are different in size, the system may obtain an average luminance value for each area instead of simply calculating the total sum of luminance values, to take into account the size difference.

Additionally, exemplary embodiments can be arranged to switch a 3D display device into the 3D display mode without direct user input. In particular, if it is determined that the user is wearing the 3D glasses (and the glasses are turned on, in the case of active glasses), it can be assumed that the user wants to watch content in 3D, and accordingly the system can be arranged to switch the display device into the 3D reproduction mode if the display device was previously reproducing visual data in the 2D reproduction mode. Therefore the user does not have to input a command to switch the display, making it easier and quicker for the user to switch between different display modes to see which mode they prefer for any given content. The system may periodically capture images at predetermined time intervals to determine whether it is necessary to switch the display device from the 2D to the 3D reproduction mode, or vice versa. Also, it is possible that a user may only temporarily remove the glasses, for example to clean the lenses or because they are about to leave the room. In some embodiments therefore, if the display device is currently in the 3D mode and it is detected that a user has removed their 3D glasses, the system may not immediately switch the display device into the 2D mode, but instead may wait for a predetermined time period and check whether the user has replaced their glasses, and only switch the display into the 2D mode if the user is still not wearing the glasses.

Furthermore, in some instances there may be multiple users watching the same display device. It is possible that some of the users are wearing 3D glasses at any given time while others are not. In this case, the facial recognition algorithm will detect a plurality of faces in the captured image, and the controller can be arranged to determine, for each face, whether the user is wearing 3D glasses. In some embodiments the system may be arranged to switch the display device into the 3D mode if at least a single user is wearing 3D glasses, or may be arranged to only switch the display device into the 3D mode if at least a predetermined number of the total number of users are wearing 3D glasses. The predetermined number can be a preset threshold value that is programed into the system, or can be a user-input threshold value.

Figure 5A:
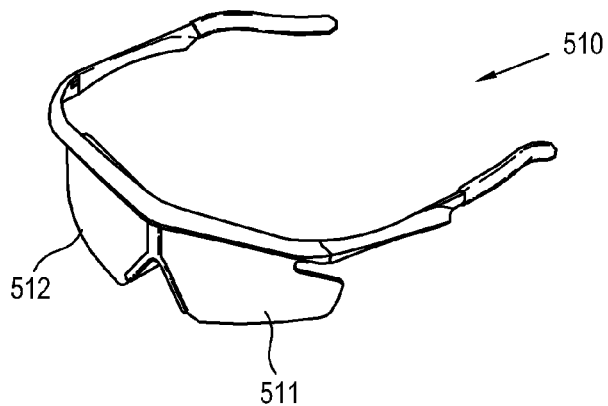
FIGS. 5A to 5C illustrate a pair of active 3D glasses suitable for use in exemplary embodiments, with the left-eye and right eye shutters in opaque and transparent states.
Figure 5B:
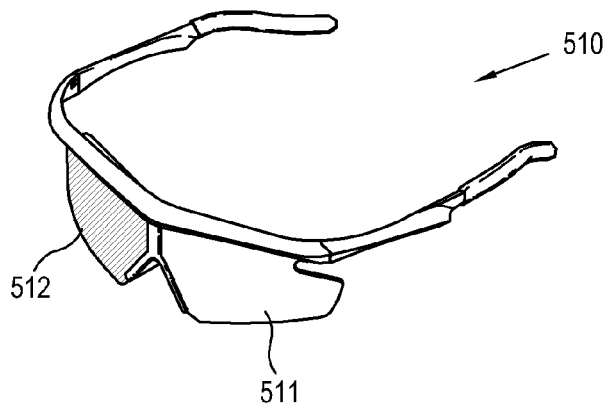
Figure 5C:
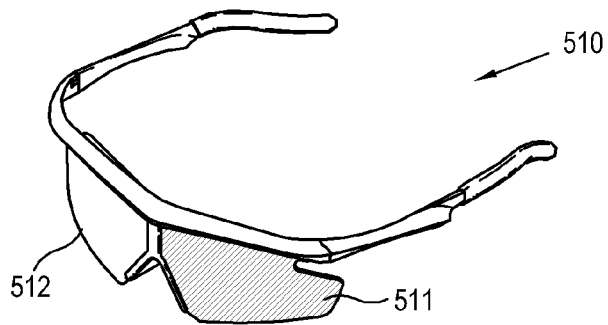

Referring now to FIGS. 5A to 5C, a pair of active 3D glasses suitable for use in exemplary embodiments is illustrated, with the left-eye and right eye shutters in opaque and transparent states. Active glasses are arranged to switch the left-eye and right-eye shutters in response to timing signals received from the display device. That is, the display device transmits timing signals to the glasses in order to switch the left-eye or right-eye shutter into the opaque state, depending on which image is currently being displayed. This ensures that the shutters are switched in synchronization with the left-eye and right-eye images as they are sequentially displayed. Conventionally, the default state of each shutter, i.e., the state when no voltage is applied, is transparent. Therefore the glasses respond to a left-eye signal to switch the left-eye shutter into the opaque state, while leaving the right-eye shutter in the default transparent state. However, in other embodiments the default state may be opaque, in which case the glasses will respond to a signal by switching the corresponding shutter into the transparent state. Furthermore, in some embodiments both eyes of the glasses may be turned opaque at the same time, and the luminance compared against a previously-captured image in which one or both eyes were transparent, to detect the 3D glasses.

Exemplary embodiments can make use of these timing signals, thereby enabling the system to operate with conventional active glasses. Specifically, the transmitter/emitter module can be a transmitter arranged to send timing signals in the conventional manner, for example as infrared (IR) signals to the glasses. In some embodiments, the transmitter/emitter module can be the transmitter that the display device uses to send the timing signals when operating in the 3D mode, although in other embodiments a separate transmitter may be provided.

In FIG. 5A, the active glasses 510 are illustrated with both the left-eye 511 and right-eye 512 shutters in transparent states. In this default state, the glasses 510 cannot be easily distinguished from standard glasses, e.g., reading glasses or sunglasses, because both eyes of the glasses have a similar appearance. FIG. 5B illustrates the same glasses 510 after a right-eye signal has been received from the transmitter/emitter module, causing the glasses 510 to apply a voltage to the right-eye shutter 512 to switch the right-eye shutter 512 into the opaque state. Similarly, FIG. 5C illustrates the glasses 510 after a left-eye signal has been received, causing the left-eye shutter 511 to be switched into the opaque state. In both FIGS. 5B and 5C, the system can detect when a user is wearing the active glasses by detecting the luminance contrast between the left-eye and right-eye shutters. That is, the system can send either the left-eye signal or the right-eye signal before capturing an image, to determine whether a user is wearing the glasses 510.

In active glasses such as the pair illustrated in FIGS. 5A to 5C, each shutter may return to the default state a certain time after being switched. This time can be referred to as the switching time of the shutter, i.e., the time for which the shutter remains switched. In addition, the imaging device of the system will require a certain time to capture a single image, and this time can be referred to as the capture time of the imaging device. Both the switching time and capture time will be characteristic for the particular type of glasses and imaging device being used, and the system can store information about the switching and capture times. To this end, the system may include the storage unit 112.

Three scenarios are possible. In the first scenario, the switching and capture times are similar, in which case a single image can be captured and the shutter will remain switched for most, or all of the time during which the image is captured. Therefore the luminance contrast should be detectable in the captured image. In the second scenario, the switching time is substantially longer than the capture time, in which case a single image is also sufficient to detect the luminance contrast as the shutter will remain switched for the duration of the image capturing process. However, in the third scenario, the switching time is substantially shorter than the capture time, such that for a significant proportion of the capture time the shutter will have reverted to the default state. This will cause the left-eye and right-eye contrast in the captured image to be reduced. Therefore if the capture time is longer than the switching time, in some embodiments the transmitter/emitter module is arranged to repeatedly transmit the signal to the glasses in order to repeatedly switch the same shutter into the opaque state during the capture time period. In this way, that shutter can be maintained in the opaque state while the image is captured, enhancing the contrast between the opaque shutter and the transparent shutter in the captured image.

Figure 6:
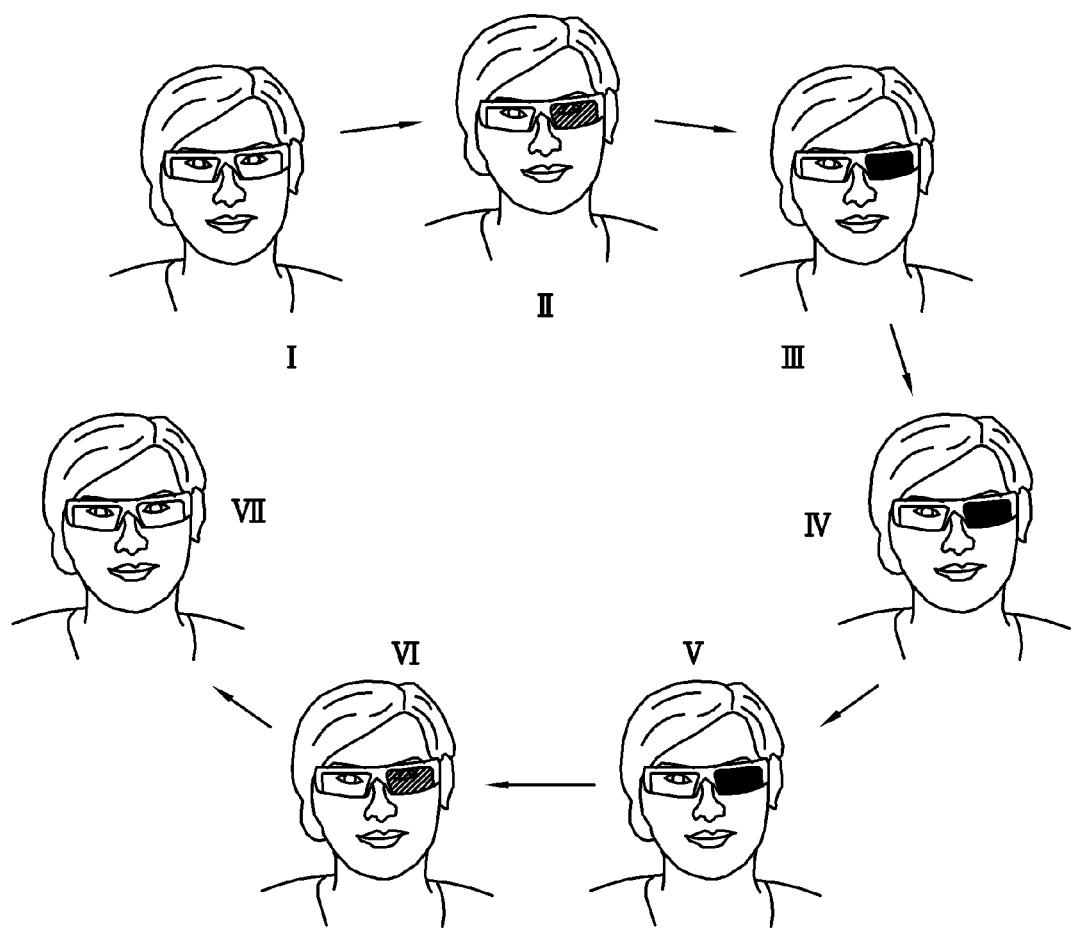
FIG. 6 illustrates a sequence of images captured while the left-eye shutter of the glasses switches from the transparent to the opaque state and reverts to the transparent state, according to an exemplary embodiment.

As well as the switching time, active glasses can be characterized by the time taken to transition from the transparent to the opaque state, and vice versa, which can be referred to as the transition time. FIG. 6 illustrates a sequence of images captured while the left-eye shutter of the glasses is switched from the transparent to the opaque state, before reverting to the transparent state. The images are labeled in sequence from I to VII. In the example of FIG. 6, the capture time of the glasses is substantially lower than the transition time, such that the transition from transparent to opaque and vice versa can be detected in a sequence of captured images. As shown in FIG. 6, the opacity of the left-eye shutter quickly increases from a minimum in image I to a maximum in images III, IV and V, and back to the minimum in image VII. In images II and VI the left-eye shutter is captured in an intermediate state, i.e. having an opacity between the transparent state of images I and VII and the opaque state of images III, IV and V.

Figure 7:
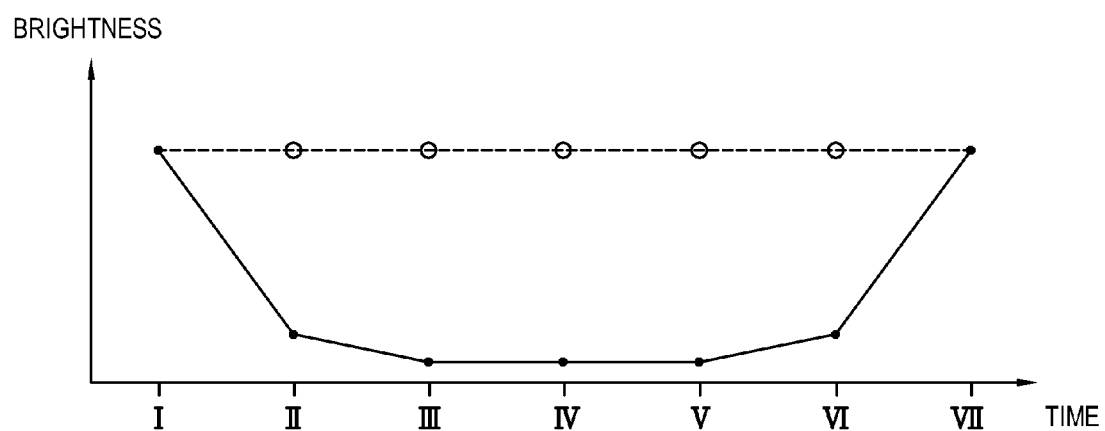
FIG. 7 shows luminance values of the left-eye and right-eye areas obtained from the sequence of images in FIG. 6.

FIG. 7 shows luminance values of the left-eye and right-eye areas obtained from the sequence of images in FIG. 6. In FIG. 7, the horizontal axis represents the image index, which in the present example corresponds directly to time as the images are captured at regular intervals. The vertical axis represents luminance. Luminance values for the left-eye area are represented by the solid circles and solid line, and luminance values for the right-eye area are represented by the open circles and dashed line. In the present example, the controller is arranged to obtain a representative luminance value for each of the left-eye and right-eye areas by summing the luminance values of all pixels within the relevant area, i.e., by obtaining the luminance sum. However, as mentioned above, in other embodiments an average value of luminance could be used instead. As shown in FIG. 7, the maximum contrast between luminance values for the right-eye and left-eye areas is obtained in images III, IV and V, when the left-eye shutter is in the fully-opaque state.

In embodiments where the capture time is short enough in comparison to the transition time to detect the shutter at intermediate states, such as the example shown in FIGS. 6 and 7, the controller can be arranged to capture a sequence of images at predetermined intervals after sending the signal using the transmitter/emitter module, and obtain a luminance contrast between the left-eye and right-eye areas for each image. The controller can further be arranged to use the maximum contrast obtained when determining whether the user is wearing the 3D glasses, i.e., to compare the maximum contrast to the predetermined threshold contrast.

Alternatively, as the time taken for the transparent to opaque transition will be constant for a given type of 3D glasses, the system can be provided with information about the transition time. In this case, the system can wait for at least the transition time after sending the signal before capturing an image, i.e., can capture the image a predetermined time after sending the signal, to ensure that the switched LC shutter is fully opaque when the image is captured.

Figure 8:
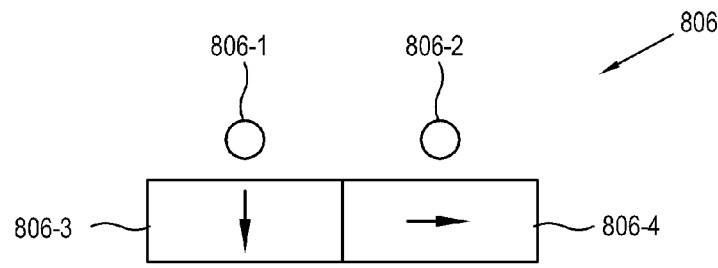
FIG. 8 illustrates a transmitter/emitter module for use with passive 3D glasses, according to an exemplary embodiment.

Referring now to FIG. 8, a transmitter/emitter module for use with passive 3D glasses is illustrated, according to an exemplary embodiment. The transmitter/emitter module 806 includes first and second light-emitting diodes (LEDs) 806-1, 806-2, a first polarizing filter 806-3 in front of the first LED 806-1, and a second polarizing filter 806-4 in front of the second LED 806-2. The LEDs should emit light at a wavelength that can be detected by the imaging device. In the present embodiment, the first polarizing filter 806-3 has a vertical polarizing direction, and the second polarizing filter 806-4 has a horizontal polarizing direction. Therefore when the first LED 806-1 is activated the emitter module 806 emits vertically-polarized light, and when the second LED 806-2 is activated the emitter module 806 emits horizontally-polarized light. Horizontal and vertical polarizations are used in the present example to provide compatibility with conventional passive glasses, which use horizontally and vertically polarizing filters. However, in other embodiments other orientations could be used, provided the polarizing directions of the filters are substantially perpendicular to each other.

Figure 9A:
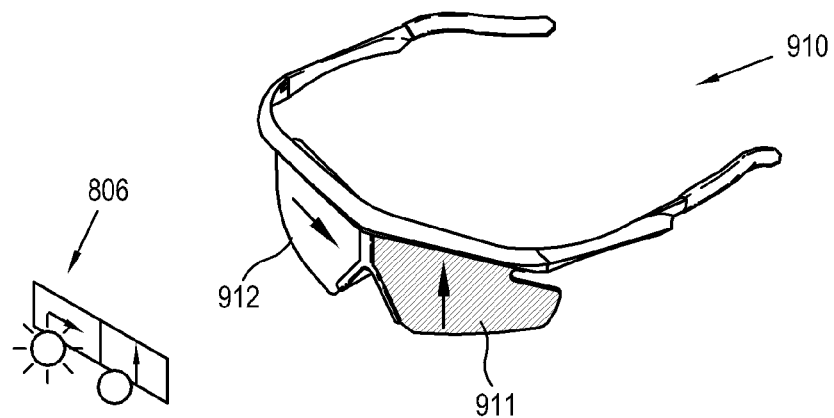
FIGS. 9A and 9B illustrate a pair of passive 3D glasses illuminated by the emitter module of FIG. 8.
Figure 9B:
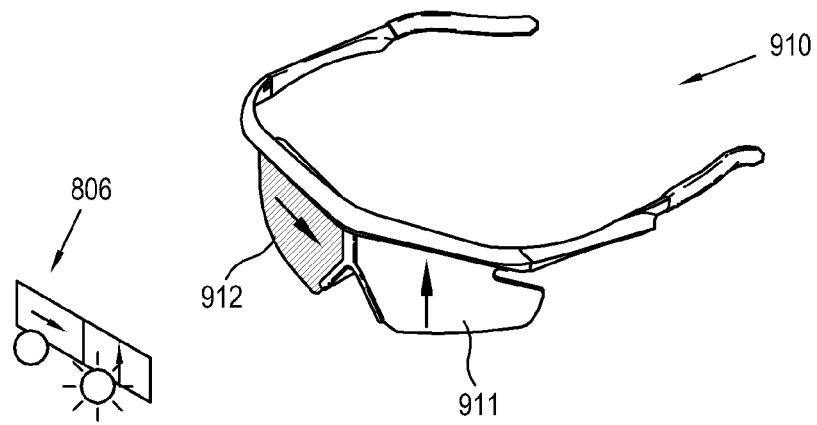

Referring now to FIGS. 9A and 9B, a pair of passive 3D glasses illuminated by the emitter module of FIG. 8 is illustrated. In 3D display devices for use with passive glasses, the left-eye and right-eye images are displayed using polarized light with different polarization directions. For example, left-eye images may be displayed using vertically-polarized light and right-eye images may be displayed using horizontally-polarized light. The left-eye and right-eye apertures of the passive glasses each include a polarizing filter having corresponding polarization directions. In the example shown, the left eye of the glasses 910 includes a vertically-polarizing filter 911, and the right eye includes a horizontally-polarizing filter 912.

In FIG. 9A, the glasses 910 are shown illuminated by horizontally-polarized light from the emitter 806, i.e. when the second LED 806-2 is illuminated. The horizontally-polarized light is able to pass through the right-eye filter 912 and reflect off a surface behind, with the result that the right eye of the glasses 910 appears bright in an image captured by the imaging device. At the same time, the horizontally-polarized light is absorbed by the left-eye filter 911, with the result that the left eye of the glasses 910 appears dark in the captured image.

In FIG. 9B, the glasses 910 are illuminated by vertically-polarized light from the emitter 806. In this case, the left eye of the glasses 910 appears light as the polarizing filter has the same polarization direction as the polarized light, while the right eye of the glasses 910 appears dark as the polarization directions are perpendicular.

As shown in FIGS. 8, 9A and 9B, exemplary embodiments can create a luminance contrast between left and right eyes of a pair of passive 3D glasses by emitting polarized light. The system can capture an image while emitting the polarized light, and analyze the captured image using a facial-recognition algorithm to determine whether a user is currently wearing the passive glasses.

Exemplary embodiments have been described in which a switchable object, such as active 3D glasses, can be detected on the basis of a single transition, i.e., by switching an LC shutter into the opaque state once. However, poor lighting conditions can cause the apparent luminance of a shutter in the transparent state to be reduced, while the apparent luminance of a shutter in the opaque state will remain largely unchanged. Therefore the luminance contrast obtained from the captured image will be lower in poor lighting conditions, and may be below the predetermined threshold contrast, meaning that the 3D glasses may not be detected.

Figure 10:
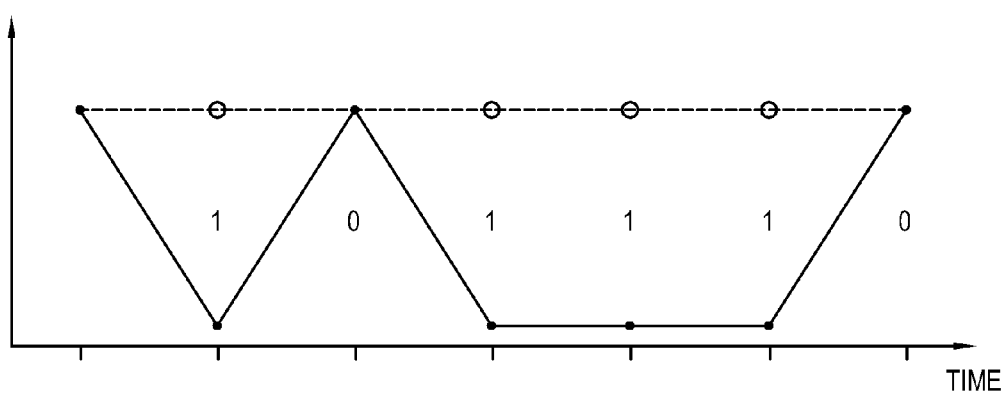
FIG. 10 illustrates an example in which a shutter of a pair of active 3D glasses is sequentially switched according to a predetermined sequence, according to an exemplary embodiment.

Accordingly, in some embodiments, the transmitter/emitter module can send a plurality of switching signals to the object according to a known sequence. An example in which a shutter of a pair of active 3D glasses is sequentially switched according to a known sequence is shown in FIG. 10. In this example, the system determines at regular time intervals whether or not to send a switching signal, based on the known sequence. The sequence can be predetermined, i.e. preprogrammed, and could for example be a predetermined pseudorandom sequence. Alternatively, the sequence could be randomly determined while the switching signals are being sent, e.g. at each interval it could be randomly determined whether or not to send a switching signal, and the system could record the randomly determined sequence as it is generated. In the example shown in FIG. 10, a binary sequence can be detected in which a value of 0 is represented by both shutters being in the same state, such that no contrast is detected, and a value of 1 is represented by both shutters being in different states such that a contrast is detected.

If a left-eye or right-eye switching signal is sent during an interval, one shutter will switch into the opaque state while the other shutter remains in the transparent state, resulting in a luminance contrast between the shutters. Alternatively if no switching signal is sent during the interval, the shutters will both be in the same state when the image is captured and there will be no luminance contrast. At each interval, image data is captured and the luminance contrast between the left-eye and right-eye areas is measured. If the user is wearing the active glasses, the measured contrast will vary over time in correspondence with the sequence in which pulses are sent to the object. The luminance contrast at each point may be obtained by capturing a single image at each interval, or may be obtained by capturing a sequence of images in the manner shown in FIG. 6 and taking a maximum value of the contrast obtained during the sequence of images.

The controller obtains a sequence of contrast values for the left-eye and right-eye areas from image data captured at the regular intervals, and compares the obtained sequence to the known sequence by which switching signals were sent to determine whether there is a match. If the sequences match, it is determined that the user is wearing the 3D glasses. By triggering a plurality of transitions according to a known sequence, the system can reliably detect the 3D glasses even under poor lighting conditions when the contrast between shutters is reduced.

As mentioned above, it is possible that the capture time of the camera may be longer than the switching or transition times of the shutters. In this case, it is possible that the capture time may be too low to accurately measure the signal which is being detected, i.e. a switching sequence such as the one shown in FIG. 10. This situation is commonly referred to as sub-Nyquist sampling, which exists when a signal is sampled at less than double its fundamental rate. In such cases, the signal obtained by measuring the variation in luminance contrast from the sequence of captured images will be an "alias" signal, i.e. a frequency which is mathematically related to, but lower than, the sampled signal frequency. However, even in this situation, the system can still use the known switching sequence to detect the 3D glasses. Specifically, the capture time of the imaging device is a constant that depends on the particular imaging device used, and similarly the switching and transition times of the shutters will be constant for a particular type of active glasses. Therefore the system can use the known values of the capture time and switching/transition times to determine the alias frequency, and can use a sub-sampling algorithm to determine the expected signal that should be detected, based on the alias frequency and the known switching sequence.

In the example shown in FIG. 10, a binary sequence is illustrated. This could be obtained by always switching the same shutter during the sequence. Alternatively, the luminance contrast could be calculated by determining which of the left-eye or right-eye areas has the highest luminance value, and subtracting the luminance value of the other area. This will always give a positive contrast value regardless of which shutter is in the opaque state. However, in other embodiments, when a luminance contrast is detected the system can also take into account whether it is the left-eye or the right-eye shutter that is in the opaque state. For example, the system can always calculate the contrast by subtracting the right-eye luminance value from the left-eye luminance value. In this example, if the left-eye shutter is in the opaque state, a negative contrast value will be obtained, whereas if the right-eye shutter is in the opaque state then a positive contrast value will be obtained. Therefore a value of 1, 0 or −1 can be represented at each interval by switching one or other of the shutters.

Figure 11:
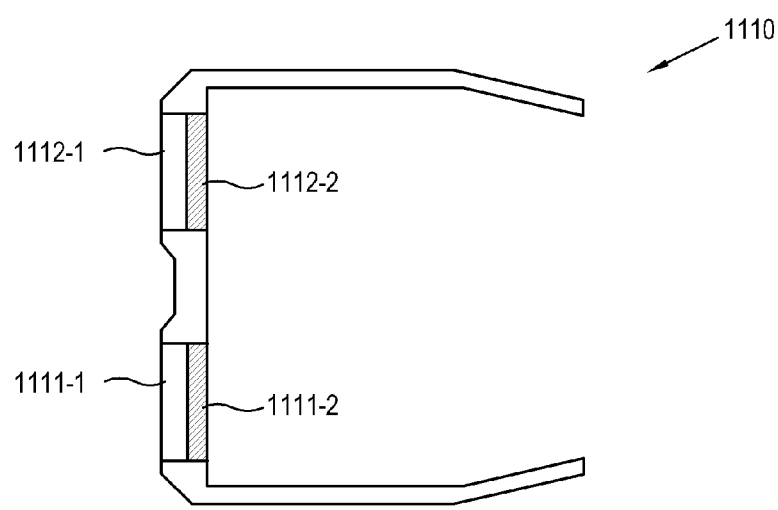
FIG. 11 illustrates a pair of 3D glasses including a reflective layer, according to an exemplary embodiment.

Referring now to FIG. 11, a pair of 3D glasses including a reflective layer is illustrated, according to an exemplary embodiment. Here, the glasses 1110 include a left-eye aperture 1111-1 and a right-eye aperture 1112-1. The left-eye and right-eye apertures 1111-1, 1111-2 may include LC shutters if the glasses 1110 are active glasses, or may include polarizing filters if the glasses 1110 are passive glasses. In the present embodiment, a reflective layer 1111-2, 1112-2 is disposed behind each LC shutter or polarizing filter such that, in use, the LC shutter or polarizing filter is disposed between the reflective layer and the imaging device. The reflective layer is a material that has a high reflectivity at a wavelength detectable by the imaging device, to increase the brightness of the left eye or right eye of the glasses when the LC shutter or polarizing filter appears transparent in the captured image. The use of reflective layers as shown in FIG. 11 can therefore increase the contrast between opaque and transparent areas in the captured image, making it easier for the system to detect the 3D glasses 1110.

Figure 12:
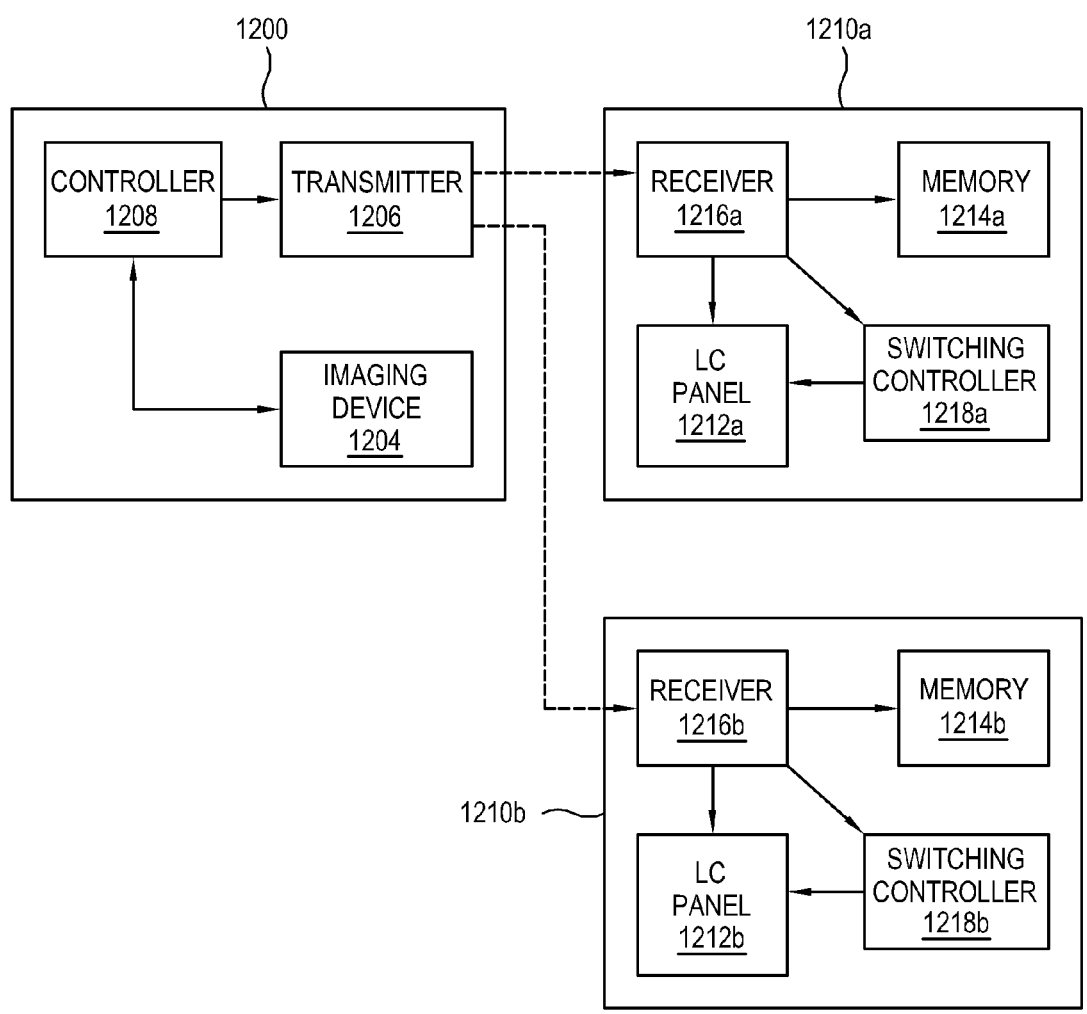
FIG. 12 illustrates a system which can detect the plurality of objects and distinguish each object from other ones of the objects, according to an exemplary embodiment.

In the above-described embodiments, systems according to exemplary embodiments analyze a captured image to detect an object. In some embodiments, if a plurality of switchable objects are present which are all controllable by the transmitter/emitter module, the system can distinguish a particular one of the objects from other ones of the objects by causing the object to switch states according to a predetermined sequence. FIG. 12 illustrates a system which can detect the plurality of objects and distinguish each object from other ones of the objects, according to an exemplary embodiment.

Like the system of FIGS. 1 and 2, the system 1200 of FIG. 12 includes an imaging device 1204, a transmitter 1206, and a controller 1208. In some embodiments, a system such as the one in FIG. 12 may also include a display device or may control a separate display device. As shown in FIG. 12, the transmitter 1206 can send signals to a plurality of objects 1210a, 1210b. The objects 1210a, 1210b are switchable objects similar to a pair of active 3D glasses, although each object includes only one switchable LC panel 1212a, 1212b. Each object further includes a receiver 1216a, 1216b, a memory 1214a, 1214b and a switching controller 1218a, 1218b to switch the LC panel 1212a, 1212b between a plurality of different states according to received commands. The memory 1214a, 1214b stores one or more predetermined sequences, each corresponding to a different command receivable from the transmitter 1206.

In more detail, the system 1200 can use the transmitter 1206 to send different signals to the objects 1210a, 1210b. For example, the system 1200 can send a location request signal to each object 1210a, 1210b to request the object 1210a, 1210b to switch the LC panel 1212a, 1212b according to the corresponding predetermined sequence stored in the memory 1214a, 1214b. Here, as the system 1200 is only concerned with locating the objects 1210a, 1210b, each object 1210a, 1210b can use the same sequence in response to the location request signal. The switching controllers 1218a, 1218b of the objects 1210a, 1210b can switch the LC panels 1212a, 1212b in a similar manner to that described above with reference to FIG. 10, and the system 1200 can capture a sequence of images and analyze the image data to locate the objects 1210a, 1210b.

Additionally to, or instead of, the location request signal, the system 1200 can also use the transmitter 1206 to send an identification request signal to the objects 1210a, 1210b. Each object 1210a, 1210b stores a unique predetermined sequence in the memory 1214a, 1214b, i.e., a predetermined sequence assigned to that object which can uniquely identify that object from other ones of the objects 1210a, 1210b. Upon receiving an identification request signal, each switching controller 1218a, 1218b switches the LC panel 1212a, 1212b according to the stored identification sequence. Therefore when the system 1200 detects the unique identification sequence for a particular object 1210a, 1210b in the captured image data, the system 1200 can accurately identify the location of that particular object 1210a, 1210b.

Embodiments similar to the one in FIG. 12 may find use in a range of applications, and not only in determining whether a user is wearing 3D glasses. For example, the switchable objects 1210a, 1210b can be in the form of tags for attaching to other items, to enable the items to be located and tracked by the system. The objects 1210a, 1210b can also be used in augmented reality applications, by using a display to overlay information on, or near to, the object in a display image including the object. In conventional augmented reality applications, a tag including a unique 2D image is used and a system analyzes a captured image to locate the tags by searching for the unique images. However, such system do not operate reliably when the tags are sharply inclined to the imaging device as it becomes more difficult for the system to identify the unique image on the tag. Also, such systems do not operate reliably in low-light conditions, and suffer from the problem that only a limited number of unique images are possible because the images have to be sufficiently different to be distinguished from one another. By uniformly switching an LC panel according to a predetermined time sequence, exemplary embodiments can overcome these shortcomings.

Figure 13:
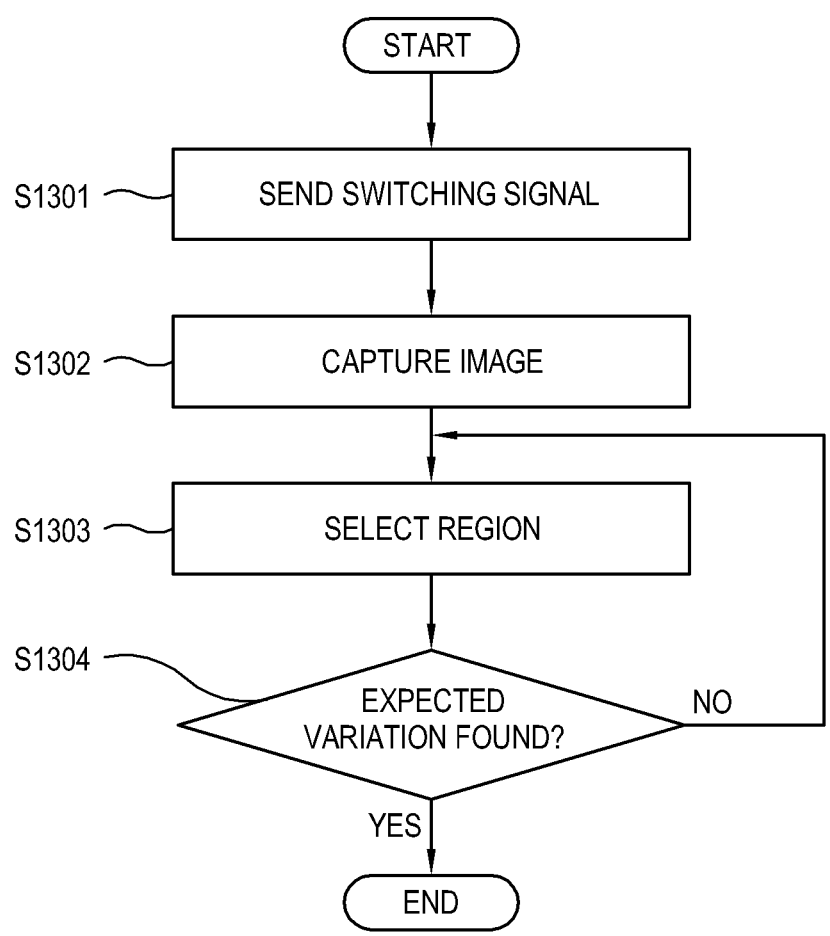
FIG. 13 illustrates a method of detecting a device including a switchable LC panel, according to an exemplary embodiment.

Referring now to FIG. 13, a method of detecting a device including a switchable LC panel is illustrated, according to an exemplary embodiment. The device may, for example, be a pair of active glasses such as those shown in FIGS. 5A to 5C, or may be a tag unit such as those shown in FIG. 12. Firstly, in operation S1301, a switching signal is sent to the device to switch the LC panel into a known one of a plurality of states. Then, in operation S1302, an image is captured while the LC panel is in the switched state. Next, in operation S1303, a region within the image is selected to be analyzed. The region may, for example, be selected using facial recognition or another type of pattern recognition algorithm, or could be selected by dividing the image into a plurality of regions and selecting each region in turn. Then, in operation S1304, a variation in pixel values within the region is compared to an expected variation. If the expected variation is found, it is determined that the device is located in that region of the image. If the expected variation is not found, the process can return to operation S1303 to select another region to be analyzed. Alternatively, the process may end if there are no other regions to be selected, for example if a facial-recognition algorithm was used and no other faces were detected.

Figure 14:
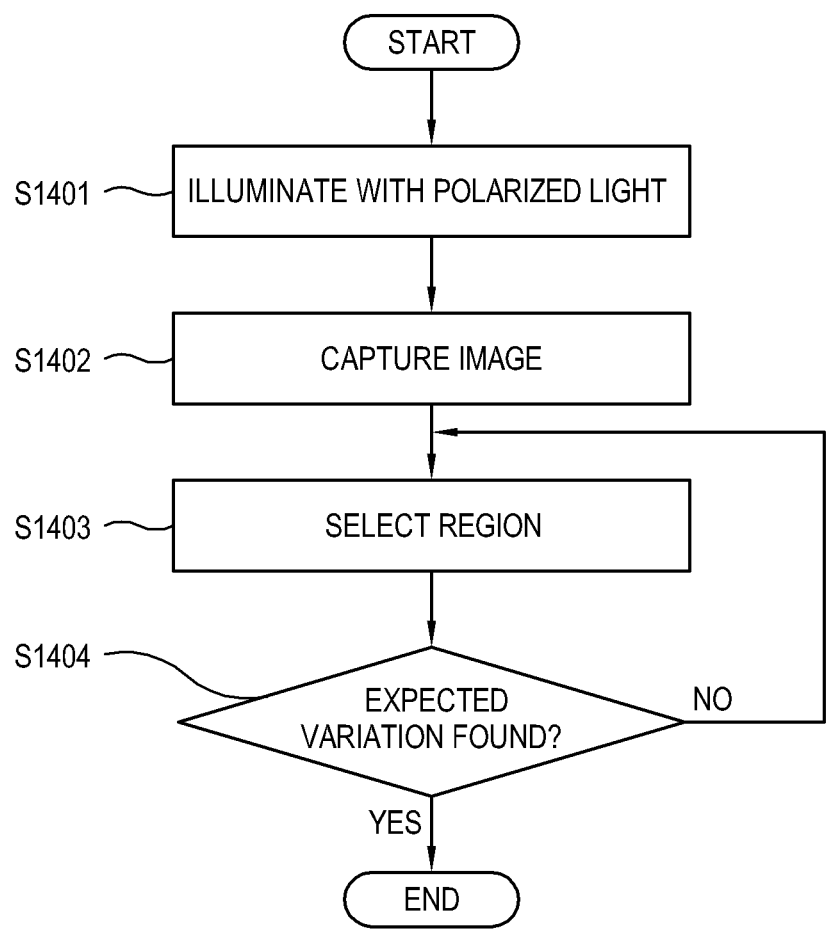
FIG. 14 illustrates a method of detecting an object including a polarizing filter, according to an exemplary embodiment.

Referring now to FIG. 14, a method of detecting an object including a polarizing filter is illustrated, according to an exemplary embodiment. Here, the method operations S1402, S1403 and S1404 are similar to the operations S1302, S1303 and S1304 of FIG. 13, and accordingly a detailed description will be omitted. However, the method of FIG. 14 differs in that in the first operation S1401, the object is illuminated with polarized electromagnetic radiation, for example at a visible wavelength or an infra-red wavelength. If the expected orientation of the object is known and the polarizing direction of the polarized light is known, the appearance of the polarizing filter in the captured image can be anticipated. However, even if the orientation of the object is not known, the object can still be detected by capturing subsequent images with and without polarized light illumination, and comparing pixel values in the same region in both images to determine whether the polarizing filter is present.

Although certain exemplary embodiments have been described for use with 3D glasses for use with 3D display devices, such embodiments can also be used with glasses for use in other display modes. For example, displays have been developed that use active or passive glasses to allow different users to watch different video content at the same time using the same display. This may be referred to as a dual-display mode, as opposed to a 3D display mode. In the dual-display mode, both shutters of a pair of active glasses can be switched opaque while an image to be viewed by another user is being displayed, and rendered transparent when an image to be viewed by the user wearing the glasses is being displayed. Alternatively, in the case of passive glasses, both filters in the glasses can have the same polarizing direction, and the display can use different polarizing directions to display the video data for different users, different pairs of glasses having different polarizing directions. Exemplary embodiments can detect when one or more users are wearing the special glasses, and switch the display into the dual-display mode if the users are wearing the glasses. When the passive glasses use the same polarizing direction for both the left-eye and right-eye filters, the system can illuminate the glasses with pulses of polarized light having different polarizing directions in a manner similar to the switching sequence shown in FIG. 10. If the luminance of the left-eye and right-eye areas changes when the polarizing direction of the illuminating light is changed, the system can determine that the user is wearing the polarizing glasses. A similar approach can be used to detect an object that includes a single polarizing filter, i.e. by illuminating the object with polarized light and detecting whether the luminance of the object in the captured image changes in the expected manner.

While certain exemplary embodiments have been described above, the skilled person will understand that many variations and modifications are possible without departing from the scope of the inventive concept as defined in the accompanying claims. Any features of any described embodiment may be used in combination with any features of any other described embodiment.

What is claimed is:
1. A display apparatus comprising:
a display configured to operate in one of a normal display mode and a dual display mode in which a first image having a first polarization direction and a second image having a second polarization direction are alternately displayed;
an image device configured to capture an appearance image of at least one of glasses, each having a polarization direction corresponding to one of the first image and the second image; and
a controller configured:
to control the image device to capture a first appearance image while the first image is displayed and a second appearance image while the second image is displayed,
to compare a first luminance value of an area in the first appearance image with a second luminance value of the area in the second appearance image, the area corresponding to the at least one glasses, and
to control the display to operate in one of the normal display mode and the dual display mode based on a difference between the first luminance value and the second luminance value.
2. The display apparatus of claim 1, wherein the controller selects a region within the appearance image captured by the imaging device.

3. The display apparatus of claim 2, wherein the controller uses a face recognition algorithm or a pattern recognition algorithm to select the region.

4. The display apparatus of claim 3, wherein the controller compares a variation in pixel values in the selected region with an expected variation, and determines that a user is wearing the glasses having the polarization direction when a difference between the variation in the pixel values and the expected variation is above a predetermined threshold value.

5. The display apparatus of claim 4, wherein when a plurality of the appearance image of the glasses are captured, the controller determines whether a plurality of users are wearing the glasses having the polarization direction on faces, and when it is determined that at least a predetermined number of the users are wearing the glasses having the polarization direction, the controller operates the display in the dual display mode.

6. The display apparatus of claim 1, wherein the glasses comprise passive glasses comprising a polarizing filter.

7. A control method of a display of a display apparatus switchable between a normal display mode and a dual display mode in which a first image having a first polarization direction and a second image having a second polarization direction are alternately displayed, the control method comprising:

capturing a first appearance image of at least one of glasses, each having a polarization direction corresponding to one of the first image and the second image while the first image is displayed and a second appearance image of the at least one of glasses while the second image is displayed, comparing a first luminance value of an area in the first appearance image with a second luminance value of the area in the second appearance image, the area corresponding to the at least one of glasses, and controlling the display to operate in one of the normal display mode and the dual display mode based on a difference between the first luminance value and the second luminance value.

8. The control method of claim 7, wherein the controlling the display apparatus comprises selecting a region within the appearance image captured by the display apparatus.

9. The control method of claim 8, wherein the selecting the region comprises using a face recognition algorithm or a pattern recognition algorithm.

10. The control method of claim 9, further comprising comparing a variation in pixel values in the selected region with an expected variation, and determining that a user is wearing the glasses having the polarization direction when a difference between the variation in the pixel values and the expected variation is above a predetermined threshold value.

11. The control method of claim 10, wherein when a plurality of the appearance image are detected, the controlling further comprises determining whether a plurality of users are wearing the glasses having the polarization direction on the faces, and when it is determined that at least a predetermined number of the users are wearing the glasses having the polarization direction, the controlling further comprises operating the display in the dual display mode.

12. The control method of claim 7, wherein the glasses comprise passive glasses comprising a polarizing filter.

13. The display apparatus of claim 1, wherein the controller determines that a user is wearing the glasses having the polarization direction when the difference between the first luminance value and the second luminance value is above a predetermined value.

14. The control method of claim 7, wherein the controlling comprises determining that a user is wearing the glasses having the polarization direction when the difference between the first luminance value and the second luminance value is above a predetermined value.

* * * * *